US012619800B2

(12) United States Patent
Long et al.

(10) Patent No.: US 12,619,800 B2
(45) Date of Patent: May 5, 2026

(54) MONITORING METHOD AND DEVICE FOR IRRIGATION WATER USE, AND COMPUTER DEVICE

(71) Applicant: TSINGHUA UNIVERSITY, Beijing (CN)

(72) Inventors: Di Long, Beijing (CN); Cai-Jin Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 989 days.

(21) Appl. No.: 17/844,738

(22) Filed: Jun. 21, 2022

(65) Prior Publication Data

US 2023/0111545 A1 Apr. 13, 2023

(30) Foreign Application Priority Data

Oct. 12, 2021 (CN) .......................... 202111185946.6

(51) Int. Cl.
G06F 30/20 (2020.01)
G06F 111/10 (2020.01)

(52) U.S. Cl.
CPC .......... G06F 30/20 (2020.01); G06F 2111/10 (2020.01)

(58) Field of Classification Search
CPC ...... G06F 30/20; G06F 2111/10; G06F 30/28; G06F 2113/08; G06F 2119/14; G06F 30/25; G06F 30/27; G06Q 50/06; G06Q 50/02; A01G 7/00; G01N 33/246
See application file for complete search history.

(56) References Cited

U.S. PATENT DOCUMENTS

2020/0241579 A1 7/2020 Ben-Ner et al.

FOREIGN PATENT DOCUMENTS

| CN | 106702981 | 5/2017 |
| CN | 110199843 | 9/2019 |
| CN | 110580657 | 12/2019 |
| CN | 113080035 | 7/2021 |

OTHER PUBLICATIONS

Lu, Nan, et al. "Evapotranspiration and soil water relationships in a range of disturbed and undisturbed ecosystems in the semi-arid Inner Mongolia, China." Journal of Plant Ecology 4.1-2 (2011): 49-60 (Year: 2011).*

(Continued)

*Primary Examiner* — Saif A Alhija

(57) ABSTRACT

Disclosed are a monitoring method and a monitoring device for irrigation water use (IWU), a computer device and a non-transitory computer readable medium. The method includes: determining a linear correlation between a first evapotranspiration (ET), a first soil water storage, and a monthly reference ET of a target region according to a first data set in response to a monitoring instruction from a user; determining multiple second soil water storages of the target region based on a second data set, and the linear correlation of the first ET, the first soil water storage, and the monthly reference ET of the target region; determining the IWU of the target region according to the first ET, the second ET, the first soil water storage, the second soil water storage of the target region, and the first preset correlation.

13 Claims, 5 Drawing Sheets

Determining a linear correlation between a first evapotranspiration (ET), a first soil water storage, and a monthly reference ET of a target region according to a first data set in response to a monitoring instruction from a user; the first data set comprising multiple groups of data; each of the multiple groups of data comprising one first ET, one first soil water storage, and one monthly reference ET; the multiple groups of data being divided according to each month in a preset time period; the first ET being an actual monthly ET of the target region without irrigation matter; and the first soil water storage being a monthly soil water storage of the target region without irrigation matter — S202

Determining multiple second soil water storages of the target region based on a second data set, and the linear correlation of the first ET, the first soil water storage, and the monthly reference ET of the target region; the second data set comprising multiple second ETs, and each of the multiple second ETs being an actual monthly ET of the target region with irrigation matter; the second soil water storage being a monthly soil water storage of the target region with irrigation matter — S204

Determining the IWU of the target region according to the first ET, the second ET, the first soil water storage, the second soil water storage of the target region, and the first preset correlation; and the first preset correlation being an operational relationship between the first ET, the second ET, the first soil water storage, the second soil water storage, and the IWU — S206

(56)  References Cited

OTHER PUBLICATIONS

Kharrou, Mohamed Hakim, et al. "Assessing irrigation water use with remote sensing-based soil water balance at an irrigation scheme level in a semi-arid region of Morocco." Remote Sensing 13.6 (2021): 1133 (Year: 2021).*

Mukherjee, A., M. Kundu, and S. Sarkar. "Role of irrigation and mulch on yield, evapotranspiration rate and water use pattern of tomato (*Lycopersicon esculentum* L.)." Agricultural Water Management 98.1 (2010): 182-189. (Year: 2010).*

Djaman, Koffi, and Suat Irmak. "Soil water extraction patterns and crop, irrigation, and evapotranspiration water use efficiency of maize under full and limited irrigation and rainfed settings." Transactions of the ASABE 55.4 (2012): 1223-1238. (Year: 2012).*

Djaman, Koffi, et al. "Crop evapotranspiration, irrigation water requirement and water productivity of maize from meteorological data under semiarid climate." Water 10.4 (2018): 405. (Year: 2018).*

Zhang, Yongqiang, and Martin Wegehenkel. "Integration of MODIS data into a simple model for the spatial distributed simulation of soil water content and evapotranspiration." Remote sensing of Environment 104.4 (2006): 393-408. (Year: 2006).*

* cited by examiner

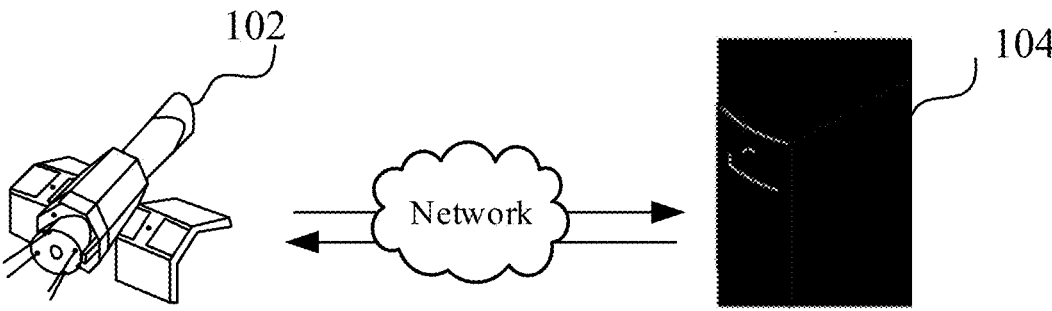

FIG. 1

Determining a linear correlation between a first evapotranspiration (ET), a first soil water storage, and a monthly reference ET of a target region according to a first data set in response to a monitoring instruction from a user; the first data set comprising multiple groups of data; each of the multiple groups of data comprising one first ET, one first soil water storage, and one monthly reference ET; the multiple groups of data being divided according to each month in a preset time period; the first ET being an actual monthly ET of the target region without irrigation matter; and the first soil water storage being a monthly soil water storage of the target region without irrigation matter
— S202

Determining multiple second soil water storages of the target region based on a second data set, and the linear correlation of the first ET, the first soil water storage, and the monthly reference ET of the target region; the second data set comprising multiple second ETs, and each of the multiple second ETs being an actual monthly ET of the target region with irrigation matter; the second soil water storage being a monthly soil water storage of the target region with irrigation matter
— S204

Determining the IWU of the target region according to the first ET, the second ET, the first soil water storage, the second soil water storage of the target region, and the first preset correlation; and the first preset correlation being an operational relationship between the first ET, the second ET, the first soil water storage, the second soil water storage, and the IWU
— S206

FIG. 2

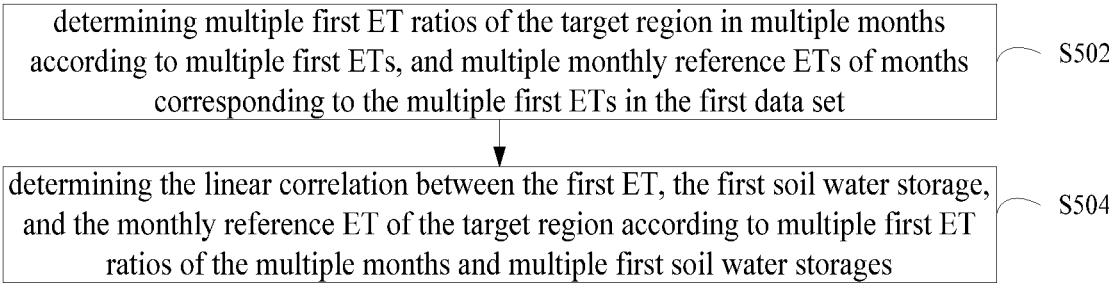

determining multiple first ET ratios of the target region in multiple months according to multiple first ETs, and multiple monthly reference ETs of months corresponding to the multiple first ETs in the first data set    S502 determining the linear correlation between the first ET, the first soil water storage, and the monthly reference ET of the target region according to multiple first ET ratios of the multiple months and multiple first soil water storages    S504

FIG. 5

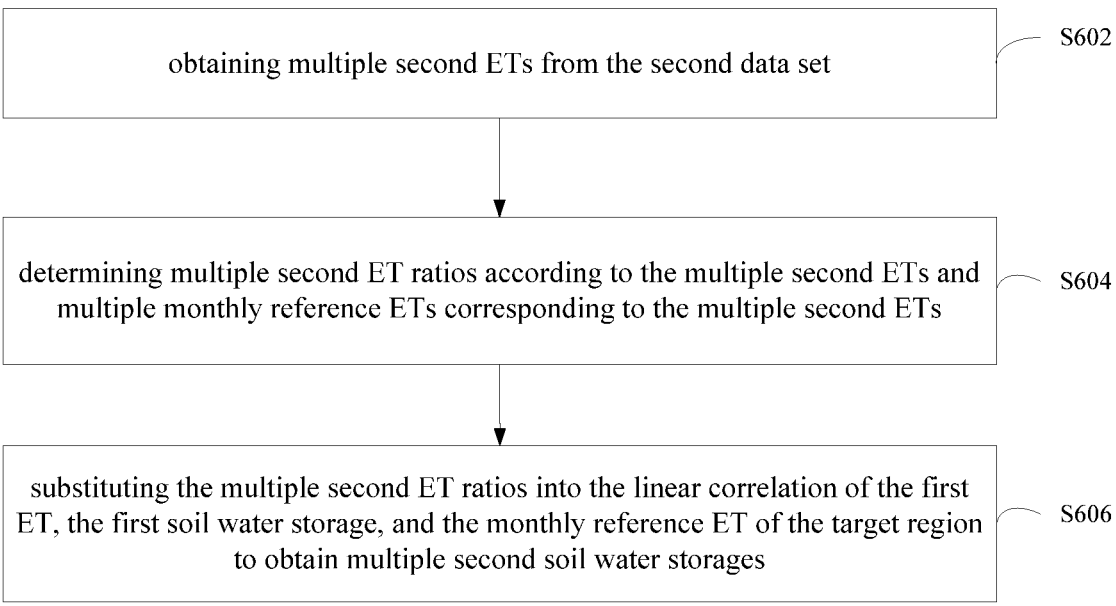

obtaining multiple second ETs from the second data set    S602 determining multiple second ET ratios according to the multiple second ETs and multiple monthly reference ETs corresponding to the multiple second ETs    S604 substituting the multiple second ET ratios into the linear correlation of the first ET, the first soil water storage, and the monthly reference ET of the target region to obtain multiple second soil water storages    S606

FIG. 6

MONITORING METHOD AND DEVICE FOR IRRIGATION WATER USE, AND COMPUTER DEVICE

CROSS-REFERENCE TO RELATED APPLICATION

The application claims priority to Chinese Patent Application No. 202111185946.6, filed on Oct. 12, 2021, the content of which is hereby incorporated by reference in its entirety.

TECHNICAL FIELD

The present application relates to the technical field of data processing, and in particular, to a monitoring method and a monitoring device for irrigation water use, a computer device, and a computer-readable storage medium.

BACKGROUND

The availability of water resources in agricultural areas affects the growth of crops, so irrigation water use (IWU) accounts for a large proportion of agricultural water use, especially in areas with little precipitation during the growth of crops. The estimated IWU has important guiding significance for optimizing a crop planting system, an irrigation plan and a water resources allocation. Therefore, accurate estimation of IWU may be used to plan the IWU and estimate the amount of groundwater drawn from the area, thereby improving the sustainability of groundwater in semi-arid areas.

At present, the estimated IWU is generally obtained by using a hydrological model, but huge amounts of data are required to establish the hydrological model. In addition, the configuration of the hydrological model has unreasonableness, and the parameters of the model have not been calibrated, so the hydrological model cannot provide an accurate estimation of IWU. Therefore, a new method is urgently needed to estimate the IWU of a target region to monitor an actual IWU of the target region, thereby better guiding agricultural production.

SUMMARY

The application provides a monitoring method and a monitoring device for irrigation water use, a computer device and a computer-readable storage medium, which can accurately estimate the irrigation water use (IWU) of a target region.

On one hand, a monitoring method for irrigation water use is provided and includes the following steps.

A linear correlation between a first ET, a first soil water storage, and a monthly reference ET of a target region is determined according to a first data set in response to a monitoring instruction from a user. The first data set includes multiple groups of data, and each group of data includes a first ET, a first soil water storage, and a monthly reference ET. The multiple groups of data are divided according to each month in a preset time period, the first ET is the actual monthly ET of the target region without irrigation matter, and the first soil water storage is a monthly soil water storage of the target region without irrigation matter.

Multiple second soil water storages of the target region are determined based on a second data set, and the linear correlation of the first ET, the first soil water storage, and the reference ET of the target region. The second data set includes multiple second ETs, and each of the second ETs is an actual monthly ET of the target region with irrigation matter. The second soil water storage is the monthly soil water storage of the target region with irrigation matter.

The IWU of the target region is determined according to the first ET, the second ET, the first soil water storage, the second soil water storage of the target region, and the first preset correlation. The first preset correlation is an operational relationship between the first ET, the second ET, the first soil water storage, the second soil water storage and the IWU.

On the other hand, a monitoring device for irrigation water use is provided, and the device includes a first determining module, a second determining module, and a third determining module.

The first determining module is configured to determine a linear correlation between a first ET, a first soil water storage, and a monthly reference ET of a target region according to a first data set in response to a monitoring instruction from a user. The first data set includes multiple groups of data, and each of the multiple groups of data includes a first ET, a first soil water storage, and a monthly reference ET. The multiple groups of data are divided according to each month in a preset time period, the first ET is the actual monthly ET of the target region without irrigation matter, and the first soil water storage is a monthly soil water storage of the target region without irrigation matter.

The second determining module is configured to determine multiple second soil water storages of the target region based on a second data set, and the linear correlation of the first ET, the first soil water storage, and the monthly reference ET of the target region. The second data set includes multiple second ETs, and each of the second ETs is an actual monthly ET of the target region with irrigation matter. The second soil water storage is the monthly soil water storage of the target region with irrigation matter.

The third determining module is configured to determine the IWU of the target region according to the first ET, the second ET, the first soil water storage, the second soil water storage of the target region, and a first preset correlation. The first preset correlation is an operational relationship between the first ET, the second ET, the first soil water storage, the second soil water storage and the IWU.

A computer device, includes a memory and a processor, and computer programs are stored on the memory. The processor, when executing the computer programs, implements steps of the method above.

A non-transitory computer readable medium is provide. Computer programs are stored on the non-transitory computer readable medium, and the computer programs, when being executed by a processor, implement steps of the method above.

The application provides the monitoring method and the monitoring device for irrigation water use, the computer device, and the non-transitory computer readable medium. The method includes the following steps. The linear correlation between the first ET, the first soil water storage, and the monthly reference ET of the target region is determined according to the first data set in response to the monitoring instruction from the user. The first data set includes multiple groups of data, and each group of data includes the first ET, the first soil water storage, and the monthly reference ET. The multiple groups of data are divided according to each month in the preset time period, the first ET is the actual monthly ET of the target region without irrigation matter, and the first soil water storage is the monthly soil water storage of the target region without irrigation matter. Multiple second soil water storages of the target region are determined based on the second data set, and the linear correlation of the first ET, the first soil water storage, and the reference ET of the target region. The second data set includes multiple second ETs, and each of the second ETs is the actual monthly ET of the target region with irrigation matter. The second soil water storage is the monthly soil water storage of the target region with irrigation matter. The IWU of the target region is determined according to the first ET, the second ET, the first soil water storage, the second soil water storage of the target region, and the first preset correlation. The first preset correlation is the operational relationship between the first ET, the second ET, the first soil water storage, the second soil water storage and the IWU. The second ET is the actual ET retrieved by remote sensing, the first ET is the actual ET simulated by a model without irrigation module, the first soil water storage is obtained through simulating the soil water content by a model without irrigation module, and the second soil water storage is obtained based on second ETs and a linear correlation between the first ET, the first soil water storage, and a monthly reference ET of the target region. The monthly IWU of the target region and the annual IWU of the target region, which have a wide range and a high spatial resolution with reliable accuracy, may be obtained by means of the remote sensing technology and the model simulation technology.

BRIEF DESCRIPTION OF THE DRAWINGS

FIG. 1 is a view showing an application environment of a monitoring method for irrigation water use (IWU) according to an embodiment.

FIG. 2 is a schematic flowchart of the monitoring method for IWU according to an embodiment.

FIG. 5 is a schematic flowchart of yet another step of the monitoring method for IWU according to yet another embodiment.

FIG. 6 is a schematic flowchart of yet another step of the monitoring method for IWU according to yet another embodiment.

DETAILED DESCRIPTION OF THE EMBODIMENTS

Figure 3:
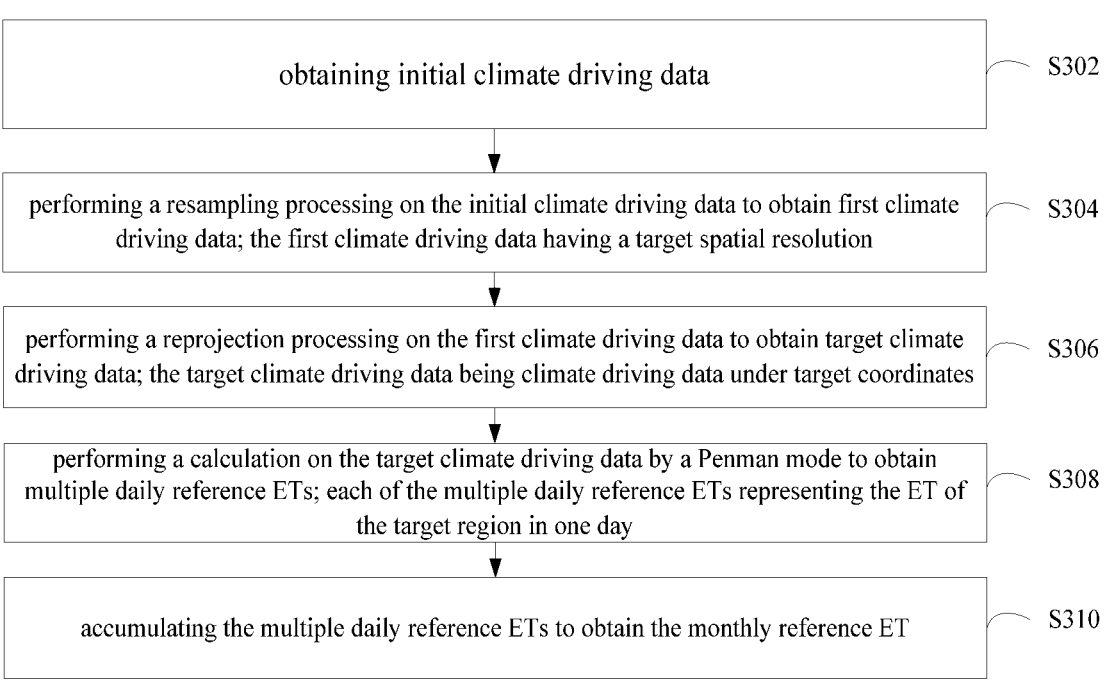
FIG. 3 is a schematic flowchart of a step of the monitoring method for IWU according to an embodiment.

In order to make the objectives, technical solutions and advantages of the application clearer and better understood, the application will be further described in detail with reference to the accompanying drawings and embodiments. It should be understood that the specific embodiments described herein are merely illustration of the application, but not intended to limit the application.

A monitoring method for irrigation water use (IWU) provided by the application may be applied to an application environment shown in FIG. 1. A target region data obtaining terminal 102 communicates with a server 104 through a network. The server 104 may obtain a first evapotranspiration, a second evapotranspiration, a first soil water storage, and a second soil water storage of the target region of a month from the target region data obtaining terminal 102, and then the obtained data are substituted into a first preset correlation to obtain the IWU of the target region in the month. The second evapotranspiration is an actual evapotranspiration (ET) retrieved by remote sensing, the first evapotranspiration is an actual ET simulated by a model without irrigation module, the first soil water storage is obtained through simulating the soil water content by a model without irrigation module, and the second soil water storage is obtained based on second ETs and a linear correlation between the first ET, the first soil water storage, and a monthly reference ET of the target region. A monthly IWU of the target region and an annual IWU of the target region, which have a wide range and a high spatial resolution with reliable accuracy, may be obtained by remote sensing technology and model simulation technology. The server 104 may be implemented by an independent server or by a server cluster including multiple servers.

In an embodiment, as shown in FIG. 2, a monitoring method for IWU is provided, and the method is applied to, for example, the server of FIG. 1, and includes the following steps S202 to S206.

At step S202, a linear correlation between a first ET, a first soil water storage, and a monthly reference ET of a target region is determined according to a first data set in response to a monitoring instruction from a user. The first data set includes multiple groups of data, and each group of data includes a first ET, a first soil water storage, and a monthly reference ET. The multiple groups of data are divided according to each month in a preset time period, the first ET is the actual monthly ET of the target region without irrigation matter, and the first soil water storage is a monthly soil water storage of the target region without irrigation matter.

The ET is a sum of evaporation from soil and transpiration through plant canopy, and the ET generally depends on following factors of three aspects:

Factors of a first aspect include atmospheric dryness, radiation conditions, air temperature, and wind, and atmospheric evaporation capacity.

Factors of a second aspect include soil water content, water conductivity, and soil water supply conditions.

Factors of a third aspect include vegetation coverage rate, water conductivity of plant, stomata number and stomatal conductance of a leaf.

The ET may be calculated by a mass transport mode, a resistance mode, an aerodynamic mode, an energy balance mode, a comprehensive mode, a solar radiation mode, and a Penman mode, etc.

The first ET of the target region is the actual ET simulated by a model without irrigation module, and is a simulated variable. The first ET may be obtained from the global land-surface dataset of ERA5, which may be obtained from a corresponding website. The first soil water storage represents the amount of soil water storage of the target region of a month, and may also be obtained from the soil data in the global land-surface dataset of ERA5. The monthly reference ET refers to the ET of specific vegetation under the conditions of sufficient water and is an ideal variable. A linear correlation between the first ET, the first soil water storage, and the monthly reference ET of the target region may be represented by $y=a+bx/z$, where x represents the first ET, y represents the first soil water storage, and z represents the monthly reference ET. It should be noted that the data in the first data set of the application are divided into multiple groups by month, and there is a one-to-one correspond between the multiple groups of data, that is, the first group of data include the first ET, the first soil water storage, and the reference ET of the target region of January, and the second group of data include the first ET, the first soil water storage, and the reference ET of the target region of February, and the like. The data of the target region in each month fluctuate, so the data of the target region in each month form the first data set.

The target region with irrigation matter or without irrigation matter means that the target region has been irrigated or not, respectively. In the application, it assumes that the linear correlation between the first ET, the first soil water storage, and the monthly reference ET of the target region, which has not been irrigated, is identical with the linear correlation of the second ET, the second soil water storage, and the monthly reference ET of the target region, which has been irrigated. Based on this assumption, the monthly soil water storage of the target region with irrigation matter may be obtained.

At step S204, multiple second soil water storages of the target region are determined based on a second data set, and the linear correlation of the first ET, the first soil water storage, and the reference ET of the target region. The second data set includes multiple second ETs, and each of the second ETs is an actual monthly ET of the target region with irrigation matter. The second soil water storage is the monthly soil water storage of the target region with irrigation matter.

The second data set includes multiple second ETs, and the multiple second ETs are also obtained according to months. The second ET is the actual ET obtained by remote sensing retrieval, and corresponds to the irrigation matter. Based on the above assumption, when the second ET of a month are randomly obtained from the second data set, the soil water storage of the target region of the corresponding month may be calculated and also corresponds to the irrigation matter. Therefore, the second ET are obtained based on satellite remote sensing technology.

At step S206, the IWU of the target region is determined according to the first ET, the second ET, the first soil water storage, the second soil water storage of the target region, and the first preset correlation. The first preset correlation is an operational relationship between the first ET, the second ET, the first soil water storage, the second soil water storage and the IWU.

The first preset correlation may be a relationship of one or more operations of, for example but not limited to, addition, subtraction, multiplication, division, integration, differentiation, and radical, for the first ET, the second ET, the first soil water storage, the second soil water storage and the IWU. The first ET of the target region may include the ETs of one month, or the ETs of several months, or the ETs of one year. Similarly, the second ET of the target region may include the ETs of one month, or the ETs of several months, or the ETs of one year. The first soil water storage of the target region may include the soil water storages of one month, the soil water storages of several months, or the soil water storages of one year. The second soil water storage of the target region may include the soil water storages of one month, the soil water storages of several months, or the soil water storages of one year. When the data above are the data of the target region of a month, then the calculated data is the monthly IWU of the target region of the month. When the data above are the data of the target region of one year, then the calculated value is the annual IWU of the target region of the year. The IWU of the target region may be calculated according to user's needs, which makes the above calculation method more flexible and suitable for more application environments.

In an embodiment, as shown in FIG. 3, an optional method embodiment of obtaining the monthly reference ET is illustrated, and the method embodiment includes the following steps S302 to S310.

At step S302, initial climate driving data are obtained.

The initial climate driving data may be obtained from the global land-surface dataset of ERA5, and the initial climate driving data may include data such as air temperature, air pressure, humidity, downward short-wave radiation and upward long-wave radiation, and wind speed in the target region. The initial climate driving data are calculated by the hour, and a spatial resolution of the data is 0.25°.

At step S304, a resampling processing is performed on the initial climate driving data to obtain first climate driving data, and the first climate driving data have a target spatial resolution.

The resampling processing is used to convert the spatial resolution of the initial climate data into a target spatial resolution, so that all data may be operated according to the same standard. For example, the spatial resolution of the initial climate data is 0.25°, and the target spatial resolution is 0.01°, that is, the data with the spatial resolution of 0.25° need to be resampled to obtain data with the spatial resolution of 0.01°.

At step S306, a reprojection processing is performed on the first climate driving data to obtain target climate driving data. The target climate driving data are the climate driving data under the target coordinates.

After the resampling processing, the data have the same spatial resolution, and then the reprojection processing is performed on the data with the same spatial resolution to project the data into the geographic projection coordinate system, thus making daily reference for data convenient.

At step S308, a calculation is performed on the target climate driving data by the Penman mode to obtain multiple daily reference ETs, and each of the daily reference ETs represents the ET of the target region in a day.

According to the above description, the daily reference ETs may be calculated by multiple modes. In the application, the calculation is performed on the climate driving data by the Penman mode commonly used in the art to obtain the reference ET of the target region in one day. A specific calculation equation is equation (1):

$$ET_{ref} = \frac{0.48\Delta(R_n - G) + \gamma\dfrac{900}{T+273}u_2(e_s - e_a)}{\Delta + \gamma(1 + 0.34u_2)} \tag{1}$$

Where $\Delta$ denotes a slope of a vapor pressure curve, $R_n$ denotes a net radiation, G denotes a soil heat flux, $\gamma$ denotes a humidity constant, T denotes an average daily temperature, $u_2$ denotes a wind speed at a height of 2 meters, $e_s$ denotes a saturated vapor pressure, and $e_a$ denotes an actual vapor pressure.

At step S310, the multiple daily reference ETs are accumulated to obtain the monthly reference ET.

According to the above equation, the daily reference ET of each day of a month may be obtained according to the obtained climate driving data of each day, and then the daily reference ET of each day in the month may be added to obtain the monthly reference ET of the current month. According to this method, the monthly reference ET of each month may be obtained, which will not be repeated herein.

Figure 4:
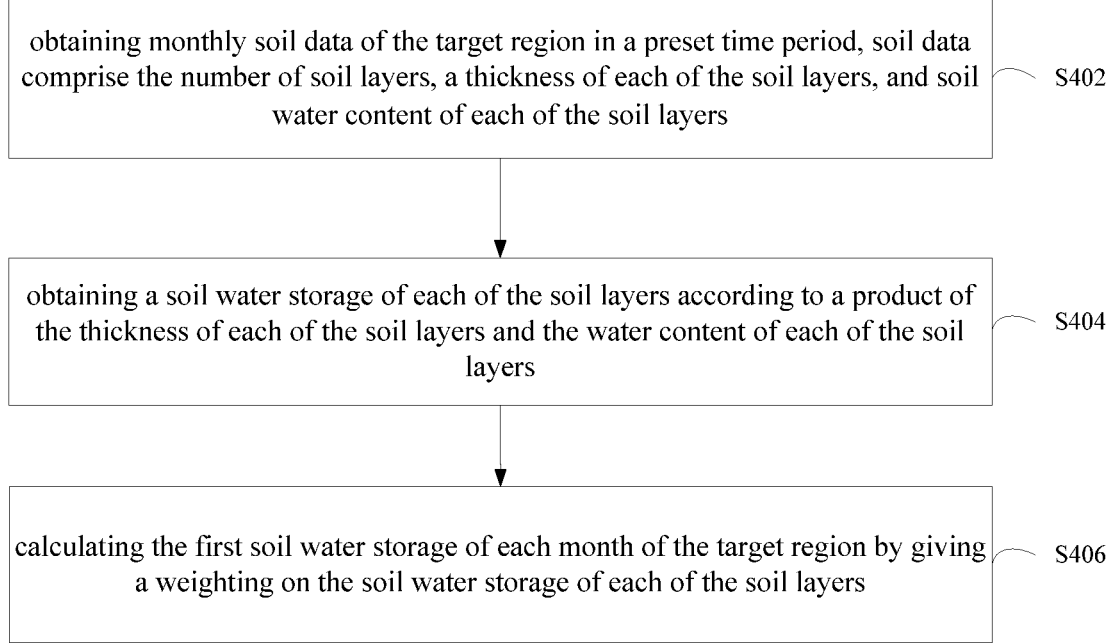
FIG. 4 is a schematic flowchart of another step of the monitoring method for IWU according to another embodiment.

In an embodiment, as shown in FIG. 4, an optional method embodiment of obtaining the first soil water storage is illustrated, and the method embodiment includes the following steps S402 to S406.

At step S402, monthly soil data of the target region in a preset time period are obtained. The soil data include the number of soil layers, a thickness of each soil layer, and the soil water content of each soil layer.

In the application, the preset time period may be, but is not limited to, one month, three months, one year, or three years. The soil data may also be obtained from the global land-surface dataset of ERA5. Soil is generally divided into three layers: a surface soil layer, a subsoil layer, and a substratum layer. The subsoil layer and the substratum layer are less affected by irrigation, and the surface soil layer is greatly affected by irrigation. The surface soil layer includes a cultivated horizon layer and a plow pan layer. Therefore, the number of soil layers of the soil data refers to the two layers, i.e., the cultivated horizon layer and the plow pan layer. For the thickness of the soil, the thickness of the cultivated horizon layer is about 20 cm, and the thickness of the plow pan layer is about 6-8 cm. The water content of the cultivated horizon layer and the water content of the plow pan layer are obtained from the global land-surface dataset of ERA5. The water content of the cultivated horizon layer and the water content of the plow pan layer may be different from day to day and may also be different from month to month.

At step S404, a soil water storage of each soil layer is obtained according to a product of the thickness of each soil layer and the water content of each soil layer.

The soil water storage of the cultivated horizon layer may be obtained by multiplying the thickness of the cultivated horizon layer and the water content of the cultivated horizon layer and is, for example, a water layer thickness of 20 cm×5%=10 mm. The soil water storage of the plow pan layer may be obtained by multiplying the thickness of the plow pan layer and the water content of the plow pan layer and is, for example, a water layer thickness of 8 cm×20%=16 mm.

At step S406, the first soil water storage of each month of the target region is calculated by giving a weighting on the soil water storage of each soil layer.

Then, the soil water storage of the cultivated horizon layer and the soil water storage of the plow pan layer are added to obtain the first soil water storage of the target region. Similarly, according to the above method, the first soil water storage of the target region in each month may be calculated.

In the monitoring method for IWU provided by the application, the first soil water storage of the target region in each month may be obtained by means of simple operations of addition, subtraction, multiplication and division, thus operating easily and obtaining the needed data rapidly, and enhancing an efficiency of monitoring the IWU.

In an embodiment, as shown in FIG. 5, an optional method embodiment of determining the linear correlation between the first ET, the first soil water storage, and the monthly reference ET of the target region is illustrated, and the method embodiment includes the following steps S502 and S504.

At step S502, first ET ratios of the target region in multiple months are determined according to multiple first ETs, and multiple monthly reference ETs of months corresponding to the multiple first ETs in the first data set.

During determination of the linear correlation, the first ET ratio needs to be calculated first, and the first ET ratio is a ratio of the first ET to the monthly reference ET. In the process of calculating the ratio, the first ET and the monthly reference ET in the first data set are obtained correspondingly, that is, the ratio is calculated based on the first ET of January and the corresponding reference ET of January, and calculated based on the first ET of February and the corresponding reference ET of February. After calculations are performed correspondingly, the first ET ratio of each month may be obtained.

At step S504, the linear correlation between the first ET, the first soil water storage, and the monthly reference ET of the target region is determined according to multiple first ET ratios of multiple months and multiple first soil water storages.

Based on the multiple first ET ratios calculated above, the linear correlation between the first ET ratio and the first soil water storage is determined according to the multiple first ET ratios and the corresponding multiple first soil water storages. For example, the first ET ratio and the first soil water storage are substituted into the linear equation $y=a+bx/z$, and a and b are solved to get the linear correlation between the first ET ratio and the first soil water storage, namely, the linear correlation between the first ET, the first soil water storage, and the monthly reference ET of the target region, where y represents the first soil water storage, and x/z represents the first ET ratio.

In the monitoring method for IWU provided by the application, the unknown constants in the linear equation may be obtained by performing fitting operations on multiple data, so as to determine the linear correlation between the target parameters. The entire operation process is simple, and not too much processing of the data is needed, and the data is easily obtained, thus determining the linear correlation between the target parameters rapidly, and improving the calculation efficiency of the IWU.

In an embodiment, as shown in FIG. 6, an optional method embodiment of obtaining the second soil water storage is illustrated, and the method embodiment includes the following steps S602 to S606.

At step S602, multiple second ETs are obtained from the second data set.

At step S604, multiple second ET ratios are obtained according to the multiple second ETs and the multiple monthly reference ETs corresponding to the multiple second ETs.

At step S606, the multiple second ET ratios are substituted into the linear correlation of the first ET, the first soil water storage, and the monthly reference ET of the target region to obtain multiple second soil water storages.

Since the linear correlation of the first ET, the first soil water storage, and the reference ET of the target region is the linear correlation between the first ET ratio and the first soil water storage, it is assumed that there is the above linear correlation between the second ET, the monthly reference ET, and the second soil water storage when the irrigation matter is considered. Therefore, based on this assumption, the second ET ratio of the second ET to the monthly reference ET is needed to be calculated first, and the calculation method is the same as the above method for calculating the first ET ratio, which will not be repeatedly described. The second ET ratio and the soil water storage satisfy the linear correlation above, therefore, when the second ET ratio and the linear correlation are given, the second soil water storage may be calculated. It should be noted that, if the second ET is the one of January, then what calculated correspondingly is the second soil water storage of the target region of January. The difference between the second soil water storage and the first soil water storage is whether the irrigation matter is considered or not. For the first soil water storage, the irrigation matter is not considered, and for the second soil water storage, the irrigation matter is considered.

In the monitoring method for IWU provided by the application, the ET and the soil water storage are correlated with each other no matter whether the irrigation matter is considered or not, and based on the same linear correlation under the two conditions, the data for which the irrigation matter is considered may be obtained according to the data of the target region for which the irrigation matter is considered. The needed soil water storage for which the irrigation matter is considered in the application may be obtained by a simple conversion, and provides a data support for a subsequent calculation to obtain the IWU of the target region.

In an embodiment, an optional method embodiment of determining the IWU of the target region is illustrated, and the method includes the following step.

The IWU of the target region is determined according to the first ET, the second ET, the first soil water storage, the second soil water storage, a fraction of an irrigation area of the target region and the second preset correlation of the target region. The second preset correlation is an operational relationship between the first ET, the second ET, the first soil water storage, the second soil water storage, the fraction of the irrigation area, and the IWU.

The second preset correlation may be a relationship of one or more operations, for example but not limited to, addition, subtraction, multiplication, division, integration, differentiation, and radical, for the first ET, the second ET, the first soil water storage, the second soil water storage, the fraction of the irrigation area, and the IWU. The first ET of the target region may be the ET of one month, or the ET of several months, or the ET of one year. Similarly, the second ET of the target region may be the ET of one month, or the ET of several months, or the ET of one year. The first soil water storage of the target region may be the soil water storage of one month, the soil water storage of several months, or the soil water storage of one year. The second soil water storage of the target region may be the soil water storage of one month, the soil water storage of several months, or the soil water storage of one year. When the data above are the data of the target region of a month, then the calculated data is the monthly IWU of the target region of the month. When the data above are the data of the target region of one year, then the calculated value is the annual IWU of the target region of the year. It should be noted that, the IWU calculated by adding a parameter of the fraction of the irrigation area is the monthly IWU for which percolation is considered, and the IWU calculated without adding the fraction of the irrigation area is the monthly IWU for which no percolation is considered. The IWU of the target region may be calculated by a selected calculation method according to user's needs, which makes the method for calculating the IWU of the target region more flexible and applicable for more application environments.

In an embodiment, an optional relational equation of the first preset correlation, for example, is $$I^{T'}_{j,month} = (ET_r - ET_m + SW_r - SW_m)/1.5,$$

where $$I^{T'}_{j,month}$$

denotes the monthly IWU of the j-th month of the target region for which no percolation is considered, $ET_r$ denotes the second ET of the j-th month of the target region, and $ET_m$ denotes the first ET of the j-th month of the target region, $SW_r$ denotes the second soil water storage of the j-th month of the target region, and SW denotes the first soil water storage of the j-th month of the target region.

In an embodiment, an optional relational equation of the second preset correlation, for example, is $$I^{T}_{j,month} = \left(I^{T'}_{j,month} + RE_{j,month}\right) \times f_{irr},$$

where $$I^{T}_{j,month}$$

denotes the monthly IWU of the j-th month of the target region for which the percolation is considered, $RE_{j,month}$ denotes the monthly percolation of the j-th month caused by irrigation, and $f_{irr}$ denotes the fraction of the irrigation area.

A derivation process of the above equations is illustrated hereinafter.

Figure 7:
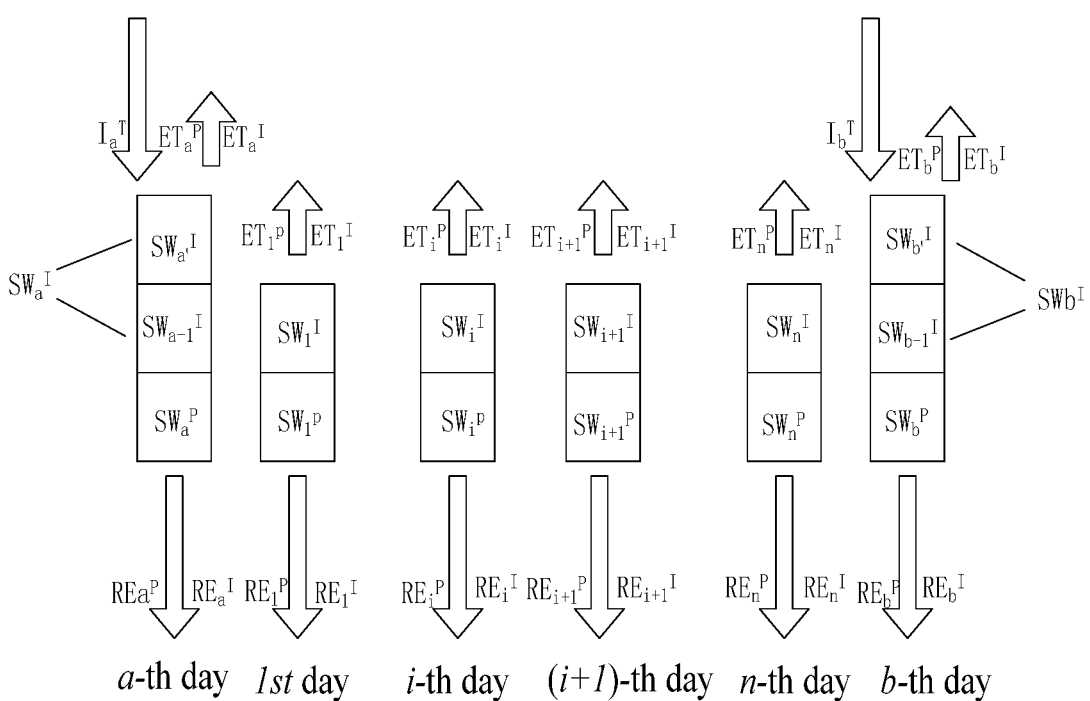
FIG. 7 is a schematic view showing a scene when an irrigation matter occurs according to an embodiment.

To better illustrate the derivation process of the equations, FIG. 7 shows the case that two irrigation matters occur on the a-th day and on the b-th day, and that no irrigation matter occurs from the first day to the n-th day between the a-th day and the b-th day. On the a-th day and on the b-th day (i.e, the first column and the last column of FIG. 7), the first square (i.e.

$$SW^I_a, SW^I_{b'})$$

represents the soil water storage of the target region caused by the irrigation matter, the second square (i.e.

$$SW^I_{a-1}, SW^I_{b-1})$$

represents the soil water storage of the target region caused by the last irrigation matter, and the third square (i.e.

$$SW^P_a \text{ or } SW^P_b)$$

represents the soil water storage caused by precipitation.

During the time interval between two irrigation matters (all columns except the first and last columns of FIG. 7), the second squares (such as $$SW^I_i \text{ and } SW^I_n)$$

represent the soil water storages of the target region caused by the irrigation matter, and the third squares (such as $$SW_i^P \text{ and } SW_n^P)$$

represent the soil water storages caused by the precipitation. $I^T$ represents a total IWU of the target region with irrigation matter, $ET^I$ and $ET^P$ represent the actual ET caused by the irrigation matter and the actual ET caused by the precipitation, respectively. $RE^I$ and $RE^P$ represent a groundwater supply from irrigation and a groundwater supply from precipitation, respectively. Subscripts, such as a and i, represent dates.

In order to derive an estimation equation of the IWU, a whole cycle (i.e, from the a-th day to the n-th day) of an a-th irrigation matter is defined as a calculation period. When the irrigation matter occurs on the a-th day, the soil water storage balance of the target region under the condition of the irrigation may be:

$$SW_a^I - SW_{a-1}^I = I_a^T - \left(ET_a^I + RE_a^I\right) \tag{2}$$

In the time interval of the two irrigation matters, the soil water storage balance of the target region on the (i+1)-th day under the condition of irrigation may be:

$$SW_i^I - SW_{i+1}^I = \left(ET_{i+1}^I + RE_{i+1}^I\right) \tag{3}$$

In addition, according to a difference between the second soil water storage and the first soil water storage, the soil water storage (i.e., $SW^I$) of the target region caused by the irrigation may be obtained, as shown in equation (4). The actual ET consumption (i.e., $ET^I$) caused by irrigation may be obtained by the difference between the second ET and the first ET, as shown in equation (5).

$$SW^I = SW^r - SW^m \tag{4}$$

$$ET^I = ET^r - ET^m \tag{5}$$

The total $$RE_{year}^I$$

of the whole cycle for all irrigation matters within one year is regarded as a whole, and equation (6) is obtained by inverting an empirical equation of deep porous flow established according to field experiments. Therefore, in equation (7), the $$RE_{year}^I,$$

as a residual error of the estimated value (i.e.

$$I_{year}^T)$$

of the annual IWU, is added to a final equation, and then the monthly cumulative value (such as $$I_{j,month}^{T'}$$

of the j-th month in equation (26)) of $$I_{year}^{T'}$$

is allocated to each month.

$$I_{year}^{T'}$$

is the remaining part of the total IWU which the $$RE_{year}^I$$

is subtracted from, in a calculation period. That is, the equation (2) and the equation (3) for the calculation period of the a-th irrigation matter may be rewritten as equation (8) and equation (9) respectively, and $$RE_{year}^I$$

does not participate in the derivation process after equation (7).

$$RE_{year}^I = \max\{0.0789 I_{year}^T - 9.1281, 0\} \tag{6}$$

$$I_{year}^T = \sum_{j=1}^{12} I_{j,month}^{T'} + RE_{year}^I \tag{7}$$

$$SW_a^I - SW_{a-1}^I = I_a^{T'} - ET_a^I \tag{8}$$

$$SW_i^I - SW_{i+1}^I = ET_{i+1}^I \tag{9}$$

Therefore, according to the equation (9) and the equation (10), by adding the $ET^I$ and the $SW^I$ from the first day to the (k+1)-th day, the soil water storage (i.e.

$$SW_a^I)$$

of the target region caused by the irrigation matter on the a-th day is derived, as shown in equation (11). (k+1) needs to be in the calculation period, that is, the k-th day ranges from the 1st day to the (n−1)-th day.

$$SW_a^I - SW_1^I + SW_1^I - SW_2^I + \dots + SW_k^I - SW_{k+1}^I = \tag{10}$$
$$ET_1^I + ET_2^I + \dots + ET_{k+1}^I$$

$$SW_a^I - SW_{k+1}^I = \sum_{i=1}^{k+1} ET_i^I \, (i = 1, 2, \dots, k+1) \tag{11}$$

Combining the equation (8) with the equation (11), $$I_a^{T'}$$

may be derived as a sum of the following three parts: an accumulation of the $$ET_i^I$$

from the a-th day to the (k+1)-th day, the $$SW_{k+1}^I$$

and the $$-SW_{a-1}^I,$$

as shown in equation (13).

$$I_a^{T'} = SW_a^I - SW_{a-1}^I + ET_a^I = \qquad (12)$$
$$\sum_{i=1}^{k+1} ET_i^I (i = 1, 2, \ldots, k+1) + SW_{k+1}^I - SW_{a-1}^I + ET_a^I$$

$$I_a^{T'} = \sum_{i=a}^{k+1} ET_i^I (i = a, 1, 2, \ldots, k+1) + SW_{k+1}^I - SW_{a-1}^I \qquad (13)$$

In the application, an equation for estimating the IWU is derived by using the soil water storage (i.e., equation (4)) of the target region caused by the irrigation and the second ET (i.e., equation (5)) caused by the irrigation in the calculation period, and the calculation period starts from the day when the irrigation matter occurs to the day before the next irrigation matter occurs.

First, a mean value of the soil water storage of the target region caused by irrigation and the actual ET consumption caused by irrigation are accumulated to obtain equation (14) and equation (15):

$$\frac{\sum_{i=a}^n (SW_i^r - SW_i^m)}{n+1} + \sum_{i=a}^n (ET_i^r - ET_i^m) = \frac{\sum_{i=a}^n SW_i^I}{n+1} + \sum_{i=a}^n ET_i^I \qquad (14)$$

$$\frac{\sum_{i=a}^n SW_i^I}{n+1} + \sum_{i=a}^n ET_i^I = \qquad (15)$$
$$\frac{\sum_{i=a}^n SW_i^I + (n+1) \times \sum_{i=a}^n ET_i^I}{n+1} = \frac{\sum_{i=a}^n (SW_i^I + ET_a^I + ET_1^I + \ldots + ET_n^I)}{n+1}$$

Secondly, according to the equation (8) and the equation (13), convert each single item of a cumulative expression in the equation (15) into an expression with $$I_a^{T'},$$

then the rightmost expression of the equation (15) may be written as the equation (16):

$$\frac{\sum_{i=a}^n (SW_i^I + ET_a^I + ET_1^I + \ldots + ET_n^I)}{n+1} = \qquad (16)$$

$$\frac{(SW_a^I + ET_a^I + ET_1^I + \ldots + ET_n^I) + \left(SW_1^I + \sum_{i=a}^1 ET_i^I + ET_2^I + \ldots + ET_n^I\right) + \ldots + \left(SW_n^I + \sum_{i=a}^n ET_i^I\right)}{n+1} =$$

$$\frac{\left[I_a^{T'} + SW_{a-1}^I + ET_1^I + \ldots + ET_n^I\right] + \left[I_a^{T'} + SW_{a-1}^I + ET_2^I + \ldots + ET_n^I\right] + \ldots + \left[I_a^T + SW_{a-1}^I\right]}{n+1} =$$

$$\frac{(n+1)\left[I_a^{T'} + SW_{a-1}^I\right] + ET_1^I + 2ET_2^I + \ldots + (n-2)ET_{n-2}^1 + (n-1)ET_{n-1}^1 + nET_n^1}{n+1} =$$

$$\frac{(n+1)\left[I_a^{T'} + SW_{a-1}^I\right] + \sum_{i=1}^n (i \times ET_i^I)}{n+1}$$

Therefore, the rightmost expression in the equation (16) may be derived from the leftmost expression in the equation (14) to obtain the equation (17):

$$\frac{\sum_{i=a}^n (SW_i^r - SW_i^m)}{n+1} + \sum_{i=a}^n (ET_i^r - ET_i^m) = \qquad (17)$$

$$\frac{(n+1)\left[I_a^{T'} + SW_{a-1}^I\right] + \sum_{i=1}^n (i \times ET_i^I)}{n+1}$$

A mean value of the actual ET (i.e., a difference between the second ET and the first ET) caused by the irrigation from the a-th day to the n-th day is introduced hereinafter $$ET_{mean}^I = \frac{\sum_{i=a}^n ET_i^I}{n+1} (i = a, 1, 2, \ldots, n) \qquad (18)$$

Then, the portion $ET^I$ in the numerator of the rightmost expression in the equation (17) is replaced by $$ET_{mean}^I,$$

and is further converted into an expression with an item $$I_a^{T'}$$

according to the equation (18) and the equation (13), that is, by using $$SW_n^I - SW_{a-1}^I = I_a^T - \sum_{i=a}^{n} ET_i^I,$$

the equation (19) is obtained:

$$\sum_{i=1}^{n}(i \times ET_{mean}^I) = \sum_{i=1}^{n} i \times ET_{mean}^I = \frac{n(n-1)}{2} ET_{mean}^I = \tag{19}$$

$$\frac{n(n-1)}{2} \frac{\sum_{i=1}^{n} ET_i^I}{n+1} \approx \frac{(n-1)}{2} \sum_{i=a}^{n} ET_i^I = \frac{(n-1)}{2}[I_a^{T'} + SW_{a-1}^I - SW_n^I]$$

Therefore, by combining the equation (19), and assuming that $$ET_{mean}^I$$

approximates to the daily actual ET consumption (i.e.

$$ET_1^I, ET_2^I, \dots , ET_n^I)$$

from the first day to the n-th day caused by the irrigation, and that $$SW_{a-1}^I$$

approximates to $$SW_n^I,$$

the equation (20) may be derived from the rightmost expression in the equation (17):

$$\frac{(n+1)[I_a^{T'} + SW_{a-1}^I] + \sum_{i=1}^{n}(i \times ET_i^I)}{n+1} \approx \tag{20}$$

$$I_a^{T'} + SW_{a-1}^I + \frac{(n-1)[I_a^{T'} + SW_{a-1}^I - SW_n^I]}{2(n+1)} \approx 1.5 I_a^{T'} + SW_{a-1}^I$$

As shown in the equation (17) and the equation (20), the sum of the mean value of soil water storage and the actual ET due to irrigation from the a-th day to the n-th day may simply approximate to $$I_a^{T'}$$

multiplied by a ratio. Equation (20) shows that the ratio is greater than 1.5. However, $$SW_{a-1}^I$$

is far less than $$1.5 I_a^{T'},$$

therefore in the invention, a ratio of 1.5 is used to calculate the IWU. Therefore, equation (21) for estimating $$I_a^{T'}$$

is finally derived by using the second ET, the second soil water storage, the simulated first ET and the simulated first soil water storage.

$$I_a^{T'} = \left[ \frac{\sum_{i=a}^{n}(SW_i^r - SW_i^m)}{n+1} + \sum_{i=a}^{n}(ET_i^r - ET_i^m) \right] \bigg/ 1.5 (i = a, 1, 2, \dots , n) \tag{21}$$

The IWU is calculated by the derived equations by using the method, and the following data are used: the second ET, the second soil water storage, the first ET, the first soil water storage, the fraction of the irrigation area.

The start time and the end time of the irrigation matter are unknown, and a coefficient of determination of a fitted relationship, which is constructed based on a monthly scale and based on the first soil water storage simulated by the model and the first ET ratio, is significantly higher than that of a fitted relationship constructed based on a daily scale, therefore, the equation (21) is used on the monthly scale, as shown in the equation (22). Although, on the monthly scale, the whole cycle (i.e., from the a-th day to the n-th day) of all irrigation matters within a month may be incompletely included, for example, the irrigation matter that occurs at the end of the month may not be included, it is assumed that the IWU in a month is large enough, so the remaining water for irrigation incompletely in the cycle may be ignored.

The calculation equations (22) through (27) of the monthly IWU and the annual IWU may be obtained by combining the equation (6), the equation (7), and the equation (22). If $$I_{j,month}^{T'}$$

is less than zero, then $$I_{j,month}^{T}$$

is set to zero.

$$I_{j,month}^{T'} = (ET_r - ET_m + SW_r - SW_m)/1.5 \quad (22)$$

$$I_{year}^{T'} = \sum I_{j,month}^{T'} \quad (23)$$

$$RE_{year} = \max\{[(0.0789 \times I_{year}^{T'} - 9.1281)/0.9211]\} \quad (24)$$

$$I_{year}^{T} = (I_{year}^{T'} + RE_{year}) \times f_{irr} \quad (25)$$

$$RE_{j,month} = RE_{year} \times I_{j,month}^{T'}/I_{year}^{T'} \quad (26)$$

$$I_{j,month}^{T} = (I_{j,month}^{T'} + RE_{j,month}) \times f_{irr} \quad (27)$$

$$I_{j,month}^{T'} \text{ and } I_{j,month}^{T}$$

represent the monthly IWU of the j-th month for which no percolation is considered and the percolation is considered, respectively. $ET_r$ denotes the second ET of the j-th month of the target region. $ET_m$ denotes the first ET of the j-th month of the target region. $SW_r$ denotes the second soil water storage of the j-th month of the target region. $SW_m$ denotes the first soil water storage of the j-th month of the target region.

$$I_{year}^{T'} \text{ and } I_{year}^{T}$$

represent the annual IWU of the target region for which no percolation is considered and the percolation is considered, respectively. $RE_{year}$ represents the annual percolation caused by irrigation, and $RE_{j,month}$ represents the j-th month percolation caused by irrigation. $f_{irr}$ denotes the fraction of the irrigation area.

It should be understood that although the steps in the flowcharts of FIGS. 2-6 are sequentially displayed according to the arrows, these steps are not necessarily performed in the order indicated by the arrows. Unless explicitly stated herein, the execution of these steps is not strictly limited to the order, and these steps may be performed in other orders. Moreover, at least part of the steps in FIGS. 2-6 may include a plurality of steps or a plurality of stages. These steps or stages are not necessarily performed simultaneously, but may be performed at different times. The order in which these steps or stages are performed is also not necessarily in sequence, but may be performed alternately with other steps or at least part of the steps or stages within the other steps.

Figure 8:
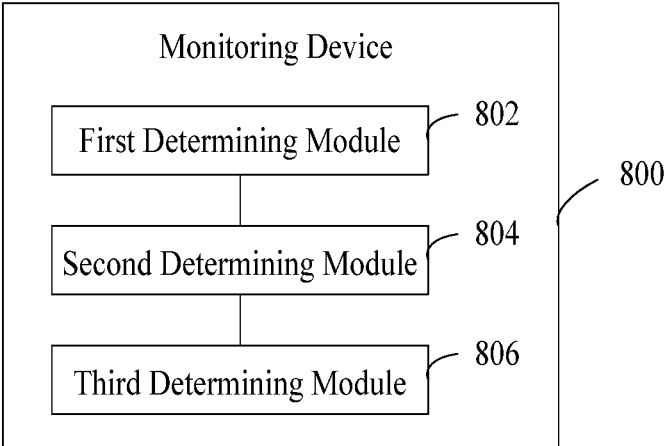
FIG. 8 is a structural block diagram showing a monitoring device for IWU according to an embodiment.

In an embodiment, as shown in FIG. 8, a monitoring device for irrigation water use 800 is provided, and includes a first determining module 802, a second determining module 804 and a third determining module 806.

The first determining module 802 is configured to determine a linear correlation between a first ET, a first soil water storage, and a monthly reference ET of a target region according to a first data set in response to a monitoring instruction from a user. The first data set includes multiple groups of data, and each of the multiple groups of data includes a first ET, a first soil water storage, and a monthly reference ET. The multiple groups of data are divided according to each month in a preset time period, the first ET is the actual monthly ET of the target region without irrigation matter, and the first soil water storage is a monthly soil water storage of the target region without irrigation matter.

The second determining module 804 is configured to determine multiple second soil water storages of the target region based on a second data set, and the linear correlation of the first ET, the first soil water storage, and the monthly reference ET of the target region. The second data set includes multiple second ETs, and each of the second ETs is an actual monthly ET of the target region with irrigation matter. The second soil water storage is the monthly soil water storage of the target region with irrigation matter.

The third determining module 806 is configured to determine the IWU of the target region according to the first ET, the second ET, the first soil water storage, the second soil water storage of the target region, and the first preset correlation. The first preset correlation is an operational relationship between the first ET, the second ET, the first soil water storage, the second soil water storage and the IWU.

In an embodiment, the monitoring device further includes a first calculating module.

The first calculating module is configured to obtain initial climate driving data, configured to perform a resampling processing on the initial climate driving data to obtain first climate driving data which have a target spatial resolution, configured to perform a reprojection processing on the first climate driving data to obtain target climate driving data which are the climate driving data under the target coordinates, configured to perform a calculation on the target climate driving data by the Penman mode to obtain multiple daily reference ETs, each of which represents the ET of the target region in one day, and configured to accumulate the multiple daily reference ETs to obtain the monthly reference ET.

In an embodiment, the monitoring device further includes a second calculating module.

The second calculating module is configured to obtain monthly soil data of the target region in a preset time period, which include the number of soil layers in the target region, a thickness of each soil layer, and the soil water content of each soil layer, and is configured to obtain a soil water storage of each soil layer according to a product of the thickness of each soil layer and the water content of each soil layer, and is configured to calculate the first soil water storage of each month of the target region by giving a weighting on the soil water storage of each soil layer.

In an embodiment, the first determining module 802 is specifically configured to determine first ET ratios of the target region in multiple months according to multiple first ETs, and multiple monthly reference ETs of months corresponding to the multiple first ETs in the first data set, and is configured to determine the linear correlation between the first ET, the first soil water storage, and the monthly reference ET of the target region according to multiple first ET ratios of multiple months and multiple first soil water storages.

In an embodiment, the second determining module 804 is specifically configured to obtain multiple second ETs from the second data set, is configured to determine multiple second ET ratios according to the multiple second ETs and the multiple monthly reference ETs corresponding to the multiple second ETs, and is configured to substitute the multiple second ET ratios into the linear correlation of the first ET, the first soil water storage, and the reference ET of the target region to obtain multiple second soil water storages.

In an embodiment, the third determining module 806 is further configured to determine the IWU of the target region according to the first ET, the second ET, the first soil water storage, the second soil water storage, a fraction of an irrigation area of the target region, and the second preset correlation of the target region. The second preset correlation is an operational relationship between the first ET, the second ET, the first soil water storage, the second soil water storage, the fraction of the irrigation area, and the IWU.

For the specific limitation of the monitoring device for IWU, please refer to the limitation of the monitoring method for IWU above, which will not be repeated described hereinafter. Each module in the monitoring device for IWU above may be implemented by software, hardware, and combinations thereof, either in whole or in part. The modules above may be embedded in or independent of the processor of the computer device in the form of hardware, or may be stored in the memory of the computer device in the form of software, so that the processor may call and execute operations corresponding to the modules above.

Figure 9:
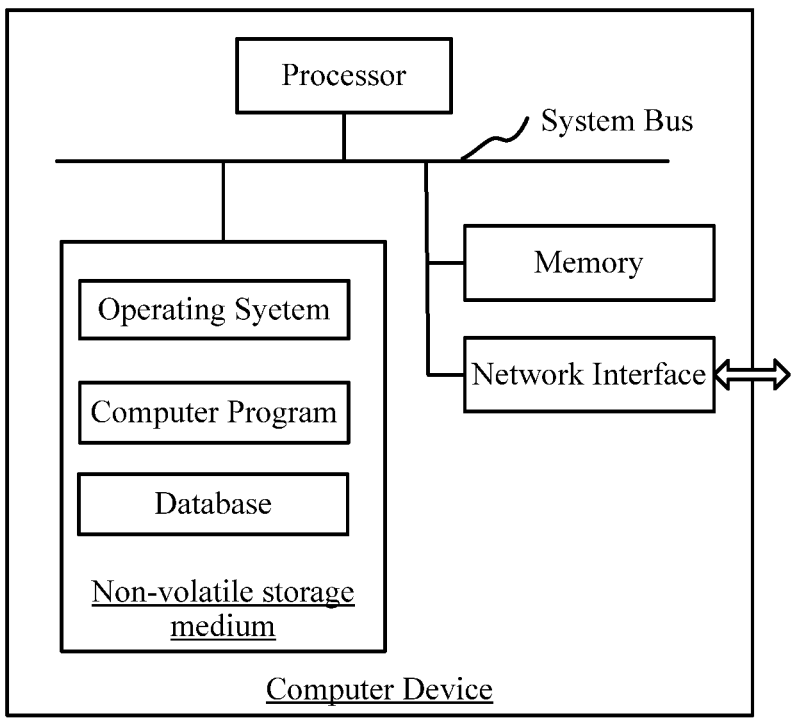
FIG. 9 is a view showing an internal structure of a computer device according to an embodiment.

In an embodiment, a computer device is provided. The computer device may be a server, and the internal structure diagram may be as shown in FIG. 9. The computer device includes a processor, a memory, a network interface, a display, and an input device, which are connected by a system bus. The processor of the computer device is configured to provide calculation and control capabilities. The memory of the computer device includes non-volatile storage medium and internal memory. The non-volatile storage medium stores an operating system and computer programs and databases. The internal memory provides an environment for the operation of the operating system and computer programs in the non-volatile storage medium. The databases of the computer device are configured to store various data of the target region. The network interface of the computer device communicates with an external terminal through a network. The computer programs, when being executed by the processor, implement a monitoring method for IWU.

Those skilled in the art may understand that the structure shown in FIG. 9 is only a block diagram of partial structure related to the solution of the present application, and does not constitute a limitation on the computer device to which the solution of the present application is applied. The specific computer device may include more or fewer components than those shown in the figures, or may combine some components, or may have a different arrangement of components.

In an embodiment, a computer device is provided. The computer device includes a memory and a processor. Computer programs are stored on the memory, and the processor, when executing the computer programs, performs the following steps.

A linear correlation between a first ET, a first soil water storage, and a monthly reference ET of a target region is determined according to a first data set in response to a monitoring instruction from a user. The first data set includes multiple groups of data, and each group of data includes a first ET, a first soil water storage, and a monthly reference ET. The multiple groups of data are divided according to each month in a preset time period, the first ET is the actual monthly ET of the target region without irrigation matter, and the first soil water storage is a monthly soil water storage of the target region without irrigation matter.

Multiple second soil water storages of the target region are determined based on a second data set, and the linear correlation of the first ET, the first soil water storage, and the reference ET of the target region. The second data set includes multiple second ETs, and each of the second ETs is an actual monthly ET of the target region with irrigation matter. The second soil water storage is the monthly soil water storage of the target region with irrigation matter.

The IWU of the target region is determined according to the first ET, the second ET, the first soil water storage, the second soil water storage of the target region, and the first preset correlation of the target region. The first preset correlation is an operational relationship between the first ET, the second ET, the first soil water storage, the second soil water storage and the IWU.

In an embodiment, the processor, when executing the computer programs, further implements the following steps.

Initial climate driving data are obtained. A resampling processing is performed on the initial climate driving data to obtain first climate driving data, and the first climate driving data have a target spatial resolution. A reprojection processing is performed on the first climate driving data to obtain target climate driving data. The target climate driving data are the climate driving data under the target coordinates. A calculation is performed on the target climate driving data by the Penman mode to obtain multiple daily reference ETs, and each of the daily reference ETs represents the ET of the target region in one day. The multiple daily reference ETs are accumulated to obtain the monthly reference ET.

In an embodiment, the processor, when executing the computer programs, further implements the following steps.

Monthly soil data of the target region in a preset time period are obtained. The soil data include the number of soil layers in the target region, a thickness of each soil layer, and the soil water content of each soil layer. A soil water storage of each soil layer is obtained according to a product of the thickness of each soil layer and the water content of each soil layer. The first soil water storage of each month of the target region is calculated by giving a weighting on the soil water storage of each soil layer.

In an embodiment, the processor, when executing the computer programs, further implements the following steps.

First ET ratios of the target region in multiple months are determined according to multiple first ETs, and multiple monthly reference ETs of months corresponding to the multiple first ETs in the first data set. The linear correlation between the first ET, the first soil water storage, and the monthly reference ET of the target region is determined according to multiple first ET ratios of multiple months and multiple first soil water storages of multiple months.

In an embodiment, the processor, when executing the computer programs, further implements the following steps.

Multiple second ETs are obtained from the second data set. Multiple second ET ratios are determined according to the multiple second ETs and the multiple monthly reference ETs corresponding to the multiple second ETs. The multiple second ET ratios are substituted into the linear correlation of the first ET, the first soil water storage, and the reference ET of the target region to obtain multiple second soil water storages.

In an embodiment, the processor, when executing the computer programs, further implements the following steps.

The IWU of the target region is determined according to the first ET, the second ET, the first soil water storage, the second soil water storage, a fraction of an irrigation area of the target region and the second preset correlation of the target region. The second preset correlation is an operational relationship between the first ET, the second ET, the first soil water storage, the second soil water storage, the fraction of the irrigation area, and the IWU.

In an embodiment, the first preset correlation is an equation of $$I^{T}_{j,month} = (ET_r - ET_m + SW_r - SW_m)/1.5,$$

where $$I^{T}_{j,month}$$

denotes the monthly IWU of the j-th month of the target region for which no percolation is considered, $ET_r$ denotes the second ET of the j-th month of the target region, and $ET_m$ denotes the first ET of the j-th month of the target region, $SW_r$ denotes the second soil water storage of the j-th month of the target region, and $SW_m$ denotes the first soil water storage of the j-th month of the target region.

In an embodiment, the second preset correlation is an equation of $$I^{T}_{j,month} = \left(I^{T}_{j,month} + RE_{j,month}\right) \times f_{irr},$$

where $$I^{T}_{j,month}$$

denotes the monthly IWU of the j-th month of the target region for which the percolation is considered, $RE_{j,month}$ denotes the monthly percolation of the j-th month of the target region caused by irrigation, and $f_{irr}$ denotes the fraction of the irrigation area.

In an embodiment, a computer readable storage medium is provided, and computer programs are stored in the computer readable storage medium. The computer programs, when being executed by the processor, implements the following steps.

A linear correlation between a first ET, a first soil water storage, and a monthly reference ET of a target region is determined according to a first data set in response to a monitoring instruction from a user. The first data set includes multiple groups of data, and each group of data includes a first ET, a first soil water storage, and a monthly reference ET. The multiple groups of data are divided according to each month in a preset time period, the first ET is the actual monthly ET of the target region without irrigation matter, and the first soil water storage is a monthly soil water storage of the target region without irrigation matter.

Multiple second soil water storages of the target region are determined based on a second data set, and the linear correlation of the first ET, the first soil water storage, and the reference ET of the target region. The second data set includes multiple second ETs, and each of the second ETs is an actual monthly ET of the target region with irrigation matter. The second soil water storage is the monthly soil water storage of the target region with irrigation matter.

The IWU of the target region is determined according to the first ET, the second ET, the first soil water storage, the second soil water storage of the target region, and the first preset correlation of the target region. The first preset correlation is an operational relationship between the first ET, the second ET, the first soil water storage, the second soil water storage and the IWU.

In an embodiment, the computer programs, when being executed by the processor, further implement the following steps.

Initial climate driving data are obtained. A resampling processing is performed on the initial climate driving data to obtain first climate driving data, and the first climate driving data have a target spatial resolution. A reprojection processing is performed on the first climate driving data to obtain target climate driving data. The target climate driving data are the climate driving data under the target coordinates. A calculation is performed on the target climate driving data by the Penman mode to obtain multiple daily reference ETs, and each of the daily reference ETs represents the ET of the target region in one day. The multiple daily reference ETs are accumulated to obtain the monthly reference ET.

In an embodiment, the computer programs, when being executed by the processor, further implement the following steps.

Monthly soil data of the target region in a preset time period are obtained. The soil data include the number of soil layers in the target region, a thickness of each soil layer, and the soil water content of each soil layer. A soil water storage of each soil layer is obtained according to a product of the thickness of each soil layer and the water content of each soil layer. The first soil water storage of each month of the target region is calculated by giving a weighting on the soil water storage of each soil layer.

In an embodiment, the computer programs, when being executed by the processor, further implement the following steps.

First ET ratios of the target region in multiple months are determined according to multiple first ETs, and multiple monthly reference ETs of months corresponding to the multiple first ETs in the first data set. The linear correlation between the first ET, the first soil water storage, and the monthly reference ET of the target region is determined according to multiple first ET ratios of multiple months and multiple first soil water storages.

In an embodiment, the computer programs, when being executed by the processor, further implement the following steps.

Multiple second ETs are obtained from the second data set. Multiple second ET ratios are determined according to the multiple second ETs and the multiple monthly reference ETs corresponding to the multiple second ETs. The multiple second ET ratios are substituted into the linear correlation of the first ET, the first soil water storage, and the reference ET of the target region to obtain multiple second soil water storages.

In an embodiment, the computer programs, when being executed by the processor, further implement the following steps.

The IWU of the target region is determined according to the first ET, the second ET, the first soil water storage, the second soil water storage, a fraction of an irrigation area of the target region and the second preset correlation of the target region. The second preset correlation is an operational relationship between the first ET, the second ET, the first soil water storage, the second soil water storage, the fraction of the irrigation area, and the IWU.

In an embodiment, the first preset correlation is an equation of $$I^{T}_{j,month} = (ET_r - ET_m + SW_r - SW_m)/1.5,$$

where $$I^{T}_{j,month}$$

denotes the monthly IWU of the j-th month of the target region for which no percolation is considered, $ET_r$ denotes the second ET of the j-th month of the target region, and $ET_m$ denotes the first ET of the j-th month of the target region, $SW_r$ denotes the second soil water storage of the j-th month of the target region, and $SW_m$ denotes the first soil water storage of the j-th month of the target region.

In an embodiment, the second preset correlation is an equation of $$I^{T}_{j,month} = \left(I^{T}_{j,month} + RE_{j,month}\right) \times f_{irr},$$

where $$I^{T}_{j,month}$$

denotes the monthly IWU of the j-th month of the target region for which the percolation is considered, $RE_{j,month}$ denotes the monthly percolation of the j-th month of the target region caused by irrigation, and $f_{irr}$ denotes the fraction of the irrigation area.

Those ordinary skilled in the art may understand that all or part of the process in the method of the above-mentioned embodiments may be implemented by instructing the relevant hardware through a computer program, and the computer program may be stored in a non-volatile readable storage medium of the computer, when being executed, the computer program may include the processes of the embodiments of the methods above. Wherein, any reference to memory, storage, database or other media used in the various embodiments provided in the application may include at least one of non-volatile and volatile memory. Non-volatile memory may include read-only memory (ROM), magnetic tape, floppy disk, flash memory, or optical memory, and the like. Volatile memory may include random access memory (RAM) or external cache memory. By way of illustration and not limitation, the RAM may be in various forms, such as static random access memory (SRAM) or dynamic random access memory (DRAM).

The technical features involved in the embodiments above may be combined arbitrarily. For the sake of concision of the description, not all possible combinations of the technical features of the embodiments are described. However, as long as there is no contradiction in the combinations of these technical features, the combinations should be considered to be within the scope of the description.

What described above are several embodiments of the application, and these embodiments are specific and detailed, but not intended to limit the scope of the application. It should be understood by the skilled in the art that various modifications and improvements may be made without departing from the concept of the application and all are within the protection scope of the application. Therefore, the scope of the disclosure is defined by the appended claims.

What is claimed is:

1. A monitoring method for irrigation water use (IWU), applied to a monitoring system for IWU comprising a target region data obtaining terminal and a server, the target region data obtaining terminal being configured to communicate with the server through a network, wherein the monitoring method carried out by the server comprises:
   obtaining a monthly reference evapotranspiration (ET), comprising:
      obtaining initial climate driving data;
      performing a resampling processing on the initial climate driving data to obtain first climate driving data; the first climate driving data having a target spatial resolution;
      performing a reprojection processing on the first climate driving data to obtain target climate driving data; the target climate driving data being climate driving data under target coordinates;
      performing a calculation on the target climate driving data by a Penman mode to obtain multiple daily reference ETs; each of the multiple daily reference ETs representing the ET of the target region in one day; and
      accumulating the multiple daily reference ETs to obtain the monthly reference ET;
   obtaining a first ET, a second ET, a first soil water storage, and a second soil water storage from the target region data obtaining terminal through the network;
   determining a linear correlation between the first ET, the first soil water storage, and the monthly reference ET of a target region according to a first data set in response to a monitoring instruction from a user; the first data set comprising multiple groups of data; each of the multiple groups of data comprising the first ET, the first soil water storage, and the monthly reference ET; the multiple groups of data being divided according to each month in a preset time period; the first ET being an actual monthly ET of the target region without irrigation matter; and the first soil water storage being a monthly soil water storage of the target region without irrigation matter;
   determining multiple second soil water storages of the target region based on a second data set, and the linear correlation of the first ET, the first soil water storage, and the monthly reference ET of the target region; the second data set comprising multiple second ETs, and each of the multiple second ETs being an actual monthly ET of the target region with irrigation matter; the second soil water storage being a monthly soil water storage of the target region with irrigation matter; and
   determining the IWU of the target region according to the first ET, the second ET, the first soil water storage, the second soil water storage of the target region, and a first preset correlation; and the first preset correlation being an operational relationship between the first ET, the second ET, the first soil water storage, the second soil water storage, and the IWU.

2. The method of claim 1, further comprising a step of obtaining the first soil water storage, wherein the step of obtaining the first soil water storage comprising:
   obtaining monthly soil data of the target region in a preset time period, the soil data comprising the number of soil layers in the target region, a thickness of each of the soil layers, and soil water content of each of the soil layers;
   obtaining a soil water storage of each of the soil layers according to a product of the thickness of each of the soil layers and the water content of each of the soil layers; and calculating the first soil water storage of each month of the target region by giving a weighting on the soil water storage of each of the soil layers.

3. The method of claim 1, wherein the determining the linear correlation between the first ET, the first soil water storage, and the monthly reference ET of the target region according to the first data set, comprising:

determining multiple first ET ratios of the target region in multiple months according to multiple first ETs, and multiple monthly reference ETs of months corresponding to the multiple first ETs in the first data set; and determining the linear correlation between the first ET, the first soil water storage, and the monthly reference ET of the target region according to multiple first ET ratios of the multiple months and multiple first soil water storages.

4. The method of claim 3, wherein the determining the multiple second soil water storages of the target region based on the second data set, and the linear correlation of the first ET, the first soil water storage, and the monthly reference ET of the target region, comprising:

obtaining multiple second ETs from the second data set;

determining multiple second ET ratios according to the multiple second ETs and multiple monthly reference ETs corresponding to the multiple second ETs; and substituting the multiple second ET ratios into the linear correlation of the first ET, the first soil water storage, and the monthly reference ET of the target region to obtain the multiple second soil water storages.

5. The method of claim 1, further comprising:

determining the IWU of the target region according to the first ET, the second ET, the first soil water storage, the second soil water storage, a fraction of an irrigation area of the target region, and a second preset correlation of the target region, wherein the second preset correlation is an operational relationship between the first ET, the second ET, the first soil water storage, the second soil water storage, the fraction of the irrigation area, and the IWU.

6. The method of claim 5, wherein the first preset correlation is an equation of $$I^T_{j,month} = (ET_r - ET_m + SW_r - SW_m)/1.5,$$

wherein:

$$I^T_{j,month}$$

denotes a monthly IWU of a j-th month of the target region for which no percolation is considered; $ET_r$ denotes a second ET of the j-th month of the target region; $ET_m$ denotes a first ET of the j-th month of the target region; $SW_r$ denotes a second soil water storage of the j-th month of the target region; and $SW_m$ denotes a first soil water storage of the j-th month of the target region.

7. The method of claim 6, wherein the second preset correlation is an equation of $$I^T_{j,month} = \left(I^T_{j,month} + RE_{j,month}\right) \times f_{irr},$$

wherein:

$$I^T_{j,month}$$

denotes a monthly IWU of the j-th month of the target region for which percolation is considered; $RE_{j,month}$ denotes a monthly percolation of the j-th month of the target region caused by irrigation; and $f_{irr}$ denotes the fraction of the irrigation area.

8. The method of claim 1, wherein the linear correlation between the first ET, the first soil water storage, and the monthly reference ET of the target region is:

y=a+bx/z, wherein X represents the first ET, y represents the first soil water storage, z represents the monthly reference ET, a and b are constants.

9. The method of claim 1, wherein the first preset correlation is a relationship of one or more operations of addition, subtraction, multiplication, division, integration, differentiation, and radical for the first ET, the second ET, the first soil water storage, the second soil water storage and the IWU.

10. The method of claim 1, wherein the multiple second ETs are obtained according to months and are actual ETs obtained by remote sensing retrieval.

11. The method of claim 1, wherein each of the multiple daily reference ETs is calculated by:

$$BT_{ref} = \frac{0.48\Delta(R_n - G) + \gamma\dfrac{900}{T + 273}u_2(e_s - e_a)}{\Delta + \gamma(1 + 0.34u_2)}$$

wherein $ET_{ref}$ of denotes a daily reference ET, $\Delta$ denotes a slope of a vapor pressure curve, $R_h$ denotes a net radiation, G denotes a soil heat flux, $\gamma$ denotes a humidity constant, T denotes an average daily temperature, $u_2$ denotes a wind speed at a height of 2 meters, $e_s$ denotes a saturated vapor pressure, and $e_a$ denotes an actual vapor pressure.

12. A computer device, being the server and comprising a memory and a processor, computer programs being stored on the memory, wherein, the processor, when executing the computer programs, implements steps of the method of claim 1.

13. A non-transitory computer readable medium, computer programs being stored on the non-transitory computer readable medium, the computer being the server, wherein, the computer programs, when being executed by a processor, implement steps of the method of claim 1.

* * * * *